(12) United States Patent
Felke

(10) Patent No.: US 11,491,399 B2
(45) Date of Patent: Nov. 8, 2022

(54) METHOD OF EXECUTING MULTI-PLAYER, SIMULATION-BASED EDUCATIONAL GAMES FROM SPREADSHEETS

(71) Applicant: Timothy John Felke, Damascus, MD (US)

(72) Inventor: Timothy John Felke, Damascus, MD (US)

( * ) Notice: Subject to any disclaimer, the term of this patent is extended or adjusted under 35 U.S.C. 154(b) by 11 days.

(21) Appl. No.: 15/929,357

(22) Filed: Apr. 28, 2020

(65) Prior Publication Data

US 2021/0331071 A1    Oct. 28, 2021

(51) Int. Cl.
| | | |
|---|---|---|
| A63F 13/55 | (2014.01) | |
| A63F 13/35 | (2014.01) | |
| G09B 19/18 | (2006.01) | |
| G09B 5/00 | (2006.01) | |

(52) U.S. Cl.
CPC .............. *A63F 13/55* (2014.09); *A63F 13/35* (2014.09); *G09B 5/00* (2013.01); *G09B 19/18* (2013.01)

(58) Field of Classification Search
CPC ............ G09B 5/00; G09B 19/18; A63F 13/55
See application file for complete search history.

(56) References Cited

U.S. PATENT DOCUMENTS

| | | | |
|---|---|---|---|
| 5,002,491 A | 3/1991 | Abrahamson et al. | |
| 5,456,607 A | 10/1995 | Antoniak | |
| 6,023,691 A * | 2/2000 | Bertrand | G06F 40/18 706/2 |
| 6,023,692 A | 2/2000 | Nichols | |
| 6,029,159 A | 2/2000 | Zorba et al. | |
| 6,125,358 A | 9/2000 | Hubbell et al. | |
| 6,267,379 B1 * | 7/2001 | Forrest | A63F 9/183 463/9 |
| 6,542,880 B2 | 4/2003 | Rosenfeld et al. | |
| 6,939,137 B1 * | 9/2005 | Colaio | G09B 19/18 463/9 |
| 8,602,793 B1 | 12/2013 | Sniedzins | |
| 9,626,875 B2 | 4/2017 | Gal et al. | |
| 2002/0119434 A1 | 8/2002 | Beams et al. | |
| 2003/0041040 A1 | 2/2003 | Bertrand et al. | |
| 2003/0084015 A1 | 5/2003 | Beams et al. | |
| 2007/0248936 A1 | 10/2007 | Huff | |
| 2009/0087828 A1 * | 4/2009 | Hartman | G09B 7/02 434/362 |
| 2009/0186328 A1 | 7/2009 | Robinson et al. | |
| 2011/0136092 A1 | 6/2011 | Murray | |
| 2020/0074873 A1 * | 3/2020 | Alsarhan | G09B 7/02 |
| 2020/0302812 A1 * | 9/2020 | Williams | G09B 5/065 |

* cited by examiner

*Primary Examiner* — Jason T Yen
(74) *Attorney, Agent, or Firm* — Dunlap Bennett & Ludwig, PLLC

(57) ABSTRACT

A method of converting one or more datasheets into a multi-player simulation-based game.

9 Claims, 13 Drawing Sheets

GOOGLE SHEETS TEMPLATE (W METADATA)

| ACCOUNT | ITEM | JAN | FEB | MAR | APR | MONTH MAY | JUN | JU |
|---|---|---|---|---|---|---|---|---|
| INITIAL STATUS | INITIAL CASH | $1,000 | $1,070 | $1,800 | $1,200 | | | |
| | QUALITY RATING | 3.20 | 3.20 | 3.20 | 3.20 | | | |
| | NUMBER OF EMPLOYEES | 9.00 | 9.00 | 9.00 | 9.00 | | | |
| PLANNING | TARGET NUMBER OF JOBS | 28 | | | | | | |
| | TARGET PRICE | $2,500 | $2,500 | $2,500 | | | | |
| | SALES BUDGET | $3,500 | $3,600 | $4,600 | | | | |
| | OPERATIONS BUDGET | $50,000 | $58,000 | $58,000 | | | | |
| | MANAGEMENT BUDGET | $13,000 | $13,000 | $14,000 | | | | |
| OPERATIONS | REVENUE | $70,000 | $80,000 | $80,000 | | | | |
| | NUMBER OF PATTERNS | 7.00 | 8.00 | 8.00 | | | | |
| | JOB LABOR COSTS | $39,200 | $44,800 | $44,800 | | | | |
| | JOB MATERIAL COSTS | $11,200 | $12,800 | $12,800 | | | | |
| | TOTAL OPERATIONS COST | $50,200 | $57,600 | $57,600 | | | | |
| | GROSS PROFIT | $19,600 | $22,400 | $22,400 | | | | |
| SALES | NUMBER OF EMPLOYEES | 1.0 | 1.0 | 1.0 | | | | |
| | REGULAR HOURS WORKED | $160 | $160 | $160 | | | | |
| | OVERTIME HOURS WORKED | $15 | $20 | $20 | | | | |
| | SALES LABOR COST | $7,000 | $7,000 | $7,000 | | | | |
| | ADVERTISING COSTS | $200 | $200 | $200 | | | | |
| | WEB SITE MANAGEMENT | $1,000 | $1,000 | $1,000 | | | | |
| | TOTAL SALES COST | $8,200 | $8,400 | $8,400 | | | | |
| MANAGEMENT | NUMBER OF MANAGEMENT | 1 | 1 | 1 | | | | |
| | MANAGEMENT STAFF COSTS | $8,000 | $8,000 | $8,000 | | | | |
| | OFFICE RENTAL COSTS | $1,000 | $1,000 | $1,000 | | | | |
| | OFFICE SUPPLIES AND | $400 | $400 | $400 | | | | |
| | TOTAL OVERHEAD COSTS | $17,600 | $17,801 | $17,801 | | | | |
| FINAL STATUS | NET PROFIT | $1,999 | $4,599 | $4,599 | | | | |
| | FINAL CAST BALANCE | $2,999 | $7,598 | $12,197 | | | | |
| | QUALITY RATING | 3.24 | 3.26 | 3.28 | | | | |
| | NUMBER OF EMPLOYEES | 9.00 | 10.00 | 10.00 | | | | |

VARIABLES ARE LISTED IN ROWS

THEY ARE GROUPED BY THE TYPE OF ACTIVITY FOR WHICH THEY RECORD THE VALUES

EACH GROUP IS COLORED TP ASSIST USER'S COMPREHENSION

TO FIG.5 CONT.

COLUMNS ARE USED TO RECORD THE VALUES OF THE VARIABLE AT A SPECIFIC TIME (E.G. MARCH)
CELLS ARE USED TO RECORD THE VALUE OF A SINGLE VARIABLE
AT A SPECIFIC TIME (E.G., THE REVENUE MARCH IS $80,000)

FIG. 5
(PRIOR ART)

| FACTOR NAME | VALUE |
|---|---|
| | |
| PAINTER HOURS PER JOB | |
| PAINTER PAY RATE | |
| MATERIAL COST PER JOB | |
| | |
| SALE PAY RATE | |
| ADVERTISING COST PER MONTH | |
| WEB SITE COST PER MONTH | |
| | |
| MANAGEMENT PAY RATE | |
| OFFICE RENTAL PER MONTH | |
| OFFICE SUPPLY COST PER MONTH | |

THE SHEET ALSO INCLUDES A LIST OF FACTORS THAT ARE USED AS CONTANTS IN EQUATIONS

| AUG | SEP | OCT | NOV | DEC |
|---|---|---|---|---|
| | | | | |

FROM FIG.5

FIG. 5 CONT.
(PRIOR ART)

GOOGLE SHEETS TEMPLATE (W METADATA)     META DATA CONTENT

METADATA CAN BE RECORDED IN VARIOUS TABLE FORMATS BUT IT MUST INCLUDE THE FOLLOWING INFORMATION:

○ GAME PAGE CONTROL TABLE

○ LIST OF SHEETS/PAGES FOR EACH STEP INDICATING WHETHER THE STEP IS PERFORMED BY INDIVIDUAL OR TEAM AND SPECIFYING ALL REPLICATED VARIABLE NAMES/LOCATIONS, LIST OF HARD SKILLS EXCERCISED, LIST OF SOFT SKILLS EXCERCISED, SCORING VARIABLE NAME AND MAXIMUM SCORE ACHIEVABLE FOR EACH STEP

○ GAMECALCULATION CONTROL TABLE

○ FORMULAS THAT TRANSFORM VALUES OF VARIABLES ON ONE PAGE INTO VALUES ON OTHER PAGE.

○ THIS IS CRITICAL FOR AGGREGATING THE DECISIONS OF EACH TEAM FOR A TURN, COMPARING TO OTHER TEAMS AND THEN DETERMINING THE ACTUAL RESULTS/SCORE FOR EACH TEAM RELATIVE TO OTHERS.

○ STUDENT SCORE CONTROL TABLE

○ FORMULAS THAT TRANSFORM VALUES OF VARIABLES ON ONE PAGE INTO SCORES FOR THE STUDENT FOR EACH PART OF THE LAB AND FOR THE LAB AS A WHOLE

FIG. 6

STUDENT RESULT RECORDS

STUDENT RESULTS

○ THE SCORE FOR EACH STUDENT FOR EACH STEP OF EACH GAME IS RECORDED AND CAN BE RETRIEVED BY EDUCATOR

○ THE RECORDS FOR EACH STEP INCLUDES THE HARD SKILLS AND SOFT SKILLS THAT ARE EXCERCISED

○ THIS ALLOWS EDUCATORS TO USE STATISTICAL TOOLS TO ASSES PERFORMANCE OF STUDENTS USING A VARIETY OF HARD SKILL AND SOFT SKILLS COMPETENCY METRICS

METHOD OF EXECUTING MULTI-PLAYER, SIMULATION-BASED EDUCATIONAL GAMES FROM SPREADSHEETS

BACKGROUND OF THE INVENTION

The present invention relates to gamification and, more particularly, to a method of executing multi-player, simulation-based educational games from spreadsheets.

Educational research confirms the high value of active learning in which the students are fully engaged in the learning process. One way to achieve this to provide interactive, simulation-based games in which students apply new concepts to solve simulated problems. While this type of learning experience is ideal for the student, it represents a substantial extra effort for the teacher, which limits the degree to which the technique is used.

Current products merely add "gamification elements" to existing lessons but does not help the educator create simulation-based games or automate their execution. The most similar existing product is a commercial educational package called "Classcraft"™. The resulting 'games' of current solutions are appropriate only for younger students. The present invention, in contrast, provides a framework through which simple spreadsheets can be turned into a game and then deployed through the systemic software to automate the execution of the resulting simulation-based game.

As can be seen, there is a need for a method of executing multi-player, simulation-based educational games from spreadsheets that do not cause additional facilitator's workload by fully automating most of the tasks related to initialization of teams, training the users, managing turn sequence, keeping score and producing student learning records. The systemic software embodied in the present invention provides a much deeper learning experience that will be preferred by students twelve and older. In short, the present invention produces simulation-based games that provide a context for deeper learning of key concepts in a way that does not require extra work for the educator.

SUMMARY OF THE INVENTION

In one aspect of the present invention, a method of converting one or more Excel, Google Sheets or similar datasheets into a multi-player simulation-based game includes the following: obtaining a first set of rules that defines a game step as a function of the metadata associated with the one or more datasheets; obtaining a game page control table for each datasheet; each game page control table having a plurality of investment variables and a plurality of impact equations; evaluating one or more investment variables and impact equations against the first set of rules to determine a respective game step for each investment variables; and applying an order to each game step by identifying the logical dependencies between activities to produce a game sequence of the one or more datasheets.

In another aspect of the present invention, a method of converting one or more datasheets into a multi-player simulation-based game, each datasheet having contents and formulas includes the following: obtaining a first set of rules that defines a game step as a function of metadata associated with the one or more datasheets; obtaining a game page control table for each datasheet; each game page control table having a plurality of investment variables and a plurality of impact equations; using the content and formulas to evaluate one or more investment variables and impact equations against the first set of rules to determine a respective game step for each investment variable; using the content and formulas to evaluate a set of scoring variables for each team and an overall score that is used to determine a score for each turn and an overall winner; and applying an order to each game step by evaluating their logical dependencies and then placing them into a proper sequential position in one or more turns to produce the game sequence of the one or more datasheets.

Wherein a method of automating the contents and formulas of for use by individual participants and one or more teams of participants includes the following: using a converted datasheet template and said metadata to create a copy of a classroom level data sheet for each class that will run the game; using the converted datasheet template and said metadata to create a copy of a team level datasheet for each team; using the converted datasheet template and said metadata to create copies of an individual level worksheets for each participant; using said metadata to assign access controls to limit who can read and who can write for each datasheet; and using metadata to copy content between sheets to facilitate cooperation and collaboration.

Example content of the Metadata used by the invention is shown in FIG. 6 and can be further illustrated to contain a table listing the phases of a typical game and the portions of the datasheet used in the individual steps of the game as illustrated below.

| Phase | Page Title | Page Type | Applicable Turns | Data Sheet Tab Name |
|---|---|---|---|---|
| Planning | Overview of Data Sheets | Training | 1 | Datasheet Overview |
| Planning | Survey of Available Resources | Materials and Environment | 1 | Overview of Resource |
| Planning | Survey of Available Energy | Energy | 1 | Overview of Energy Usage |
| Planning | Survey of Available Tools | Tools & Equipment | 1 | Overview of Tools |
| Planning | Survey of Consumption | Consumption | 1 | Overview of Consumption |
| Planning | Training for Planning | Intelligence | 1 | Training for Planning |
| Planning | Planning Worksheet | Intelligence | All | Individual Planning |
| Planning | Building Consensus | Consensus | All | Planning Consensus |
| Execution | Training for Hunt | Training | All | Training for |

-continued

| Phase | Page Title | Page Type | Applicable Turns | Data Sheet Tab Name |
|---|---|---|---|---|
| | Game with Limited Language | | | Hunt Game |
| Map | Claiming Territory | Map | All | Map |
| Execution | Hunt Game | Processing & Transport | 1 | Hunt Game (Level 1) |
| Completion | Turn Completion Activities | Training | All | Turn Completion |
| Turn Results | Game Result Activities | Training | All | Game Completion |

Wherein a method of facilitating cooperation between each team includes the following: using said metadata to specify that certain decisions by each team will require majority consent and others will require unanimous consent; using said metadata to allow a facilitator or student to initiate text messaging sessions with selected participants in association with a specific step in the game; using said metadata to allow the facilitator or student to initiate a video meeting session with selected students in association with each specific step in the game; and enabling the facilitator to schedule a shared activity in the game.

Wherein a method of automating an assessment of each participant includes the following: measuring time spent by each participant on each activity; measuring of a percentage of time each participant of each shared activity; measuring of a percentage of shared text message content was contributed by each participant; and measuring of a score for each individual activity assigned to the participant; measuring a relation of a score associated with the shared activity for each team in comparison to the classroom average for the shared activity; and measuring of a relation of a participant survey results for each team to which the participant has been associated in comparison to an average of all teams for surveys for the shared activities.

These and other features, aspects and advantages of the present invention will become better understood with reference to the following drawings, description and claims.

BRIEF DESCRIPTION OF THE DRAWINGS

FIG. 5 is an exemplary view of a prior art spreadsheet or electronic worksheet;

FIG. 6 is a list of required information recorded in the metadata for the system application;

FIG. 8 is a list of description for the student result sheets;

Figure 11:
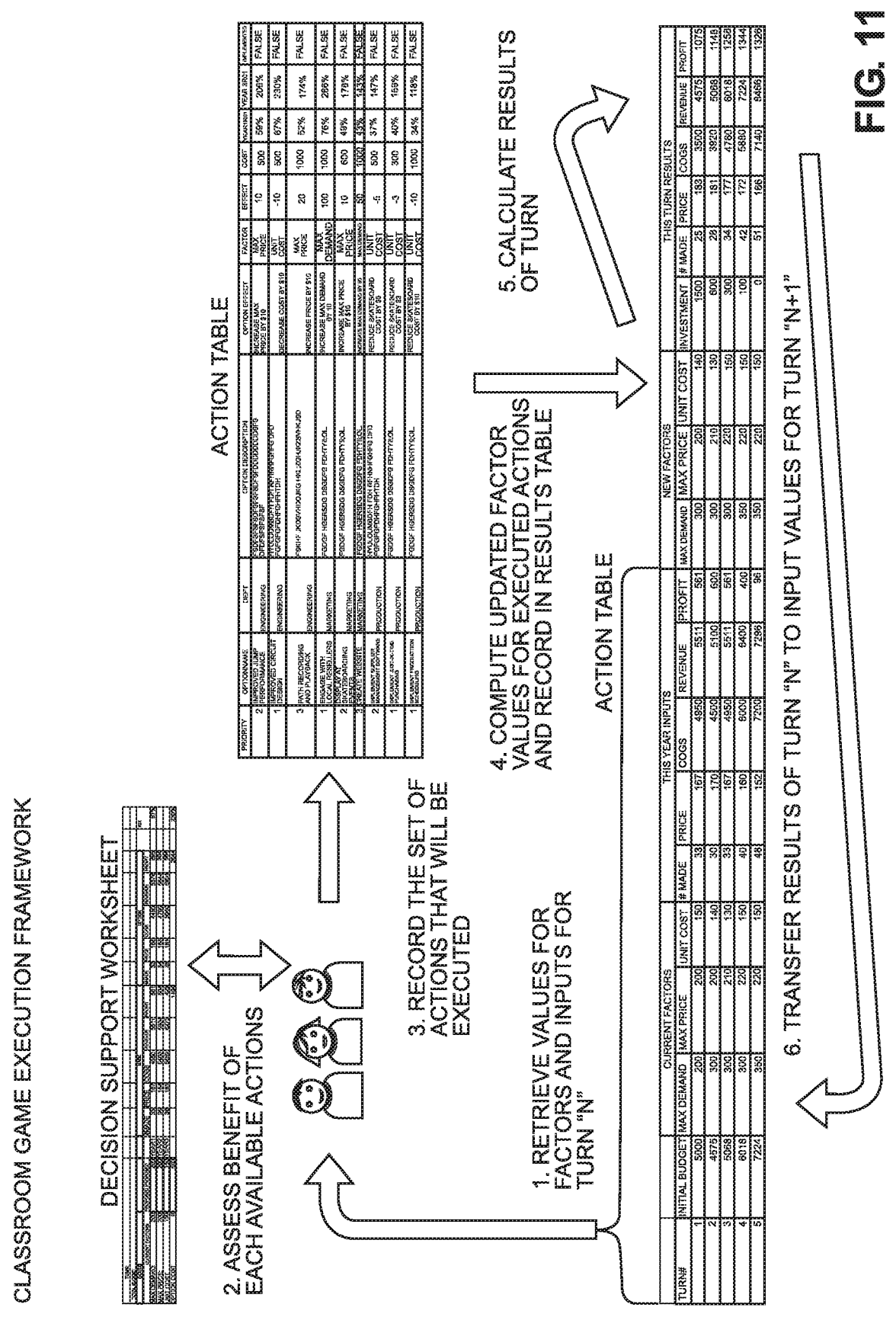

FIG. 11 is a diagrammatic view of an exemplary embodiment of the present invention, illustrating the workings of the application described with spreadsheets.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a method of converting one or more datasheets into a multi-player simulation-based game.

The ordered combination of various ad hoc and automated tasks in the presently disclosed platform necessarily achieve technological improvements through the specific processes described more in detail below. In addition, the unconventional and unique aspects of these specific automation processes represent a sharp contrast to merely providing a well-known or routine environment for performing a manual or mental task.

Figure 1:
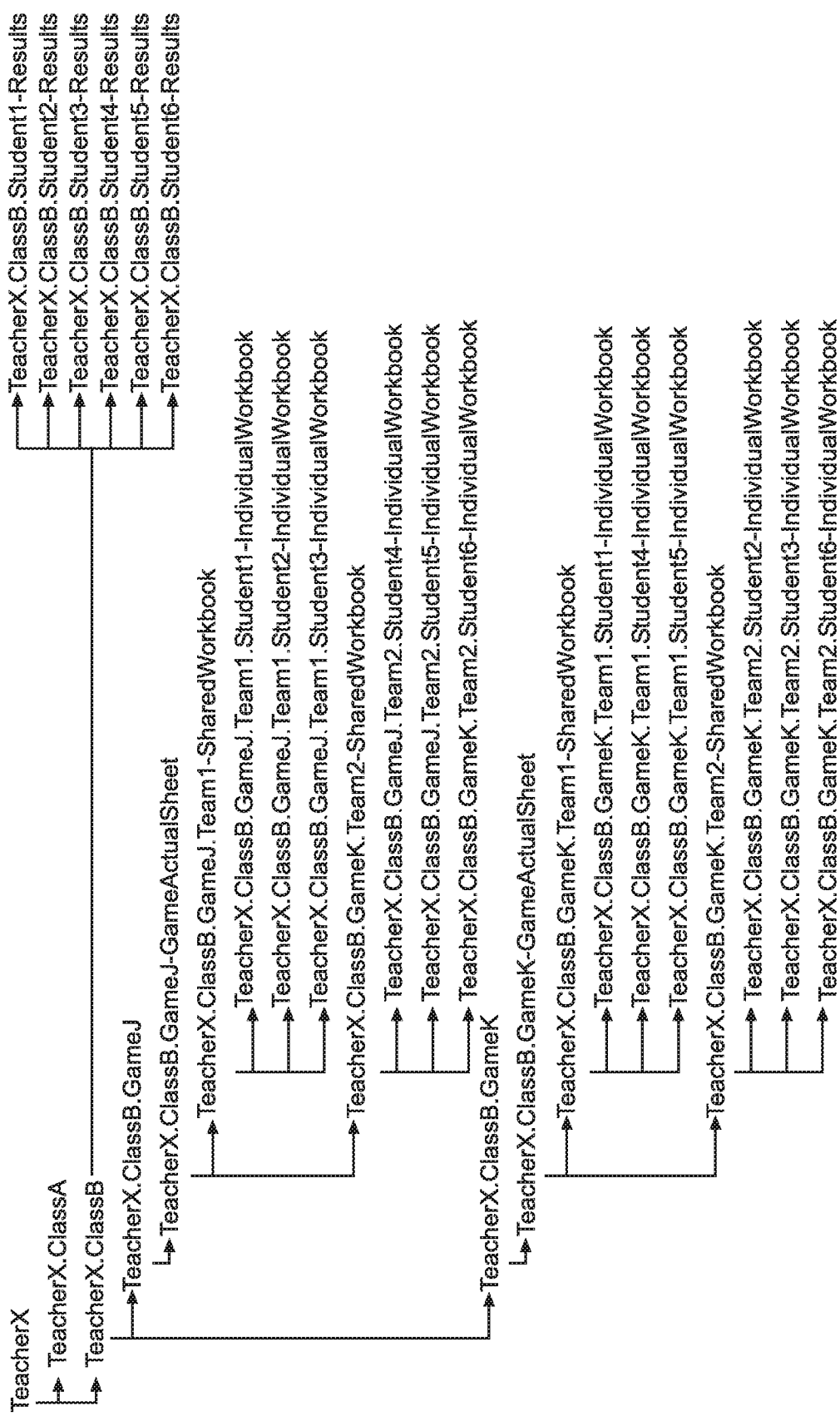
FIG. 1 is a diagrammatic view of an exemplary embodiment of the present invention, illustrating the distribution of work books in a classroom.
Figure 2:
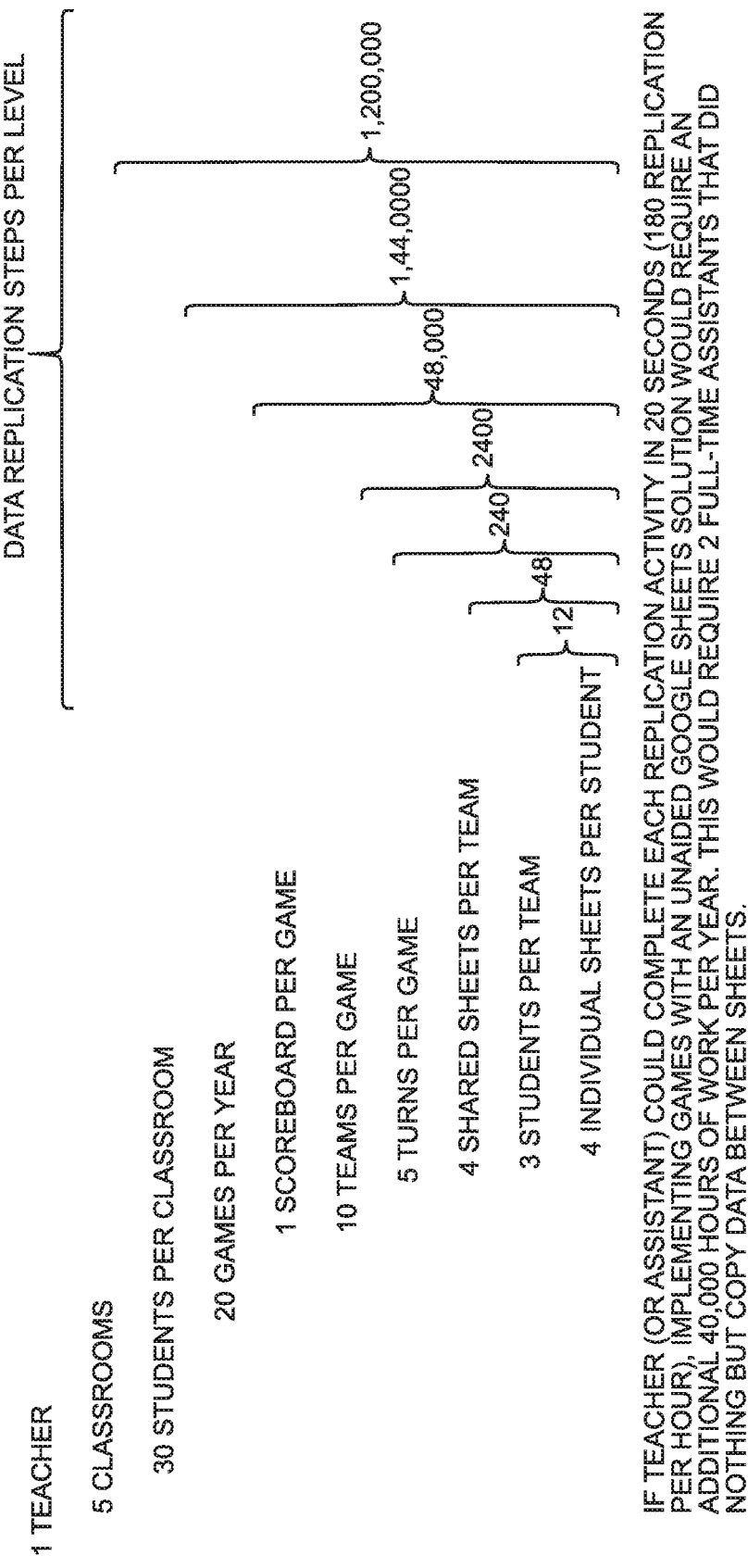
FIG. 2 is a diagrammatic view of an exemplary embodiment of the present invention, illustrating a yearly throughput of data for a facilitator without the invention and the impact of the invention on this effort.
Figure 3:
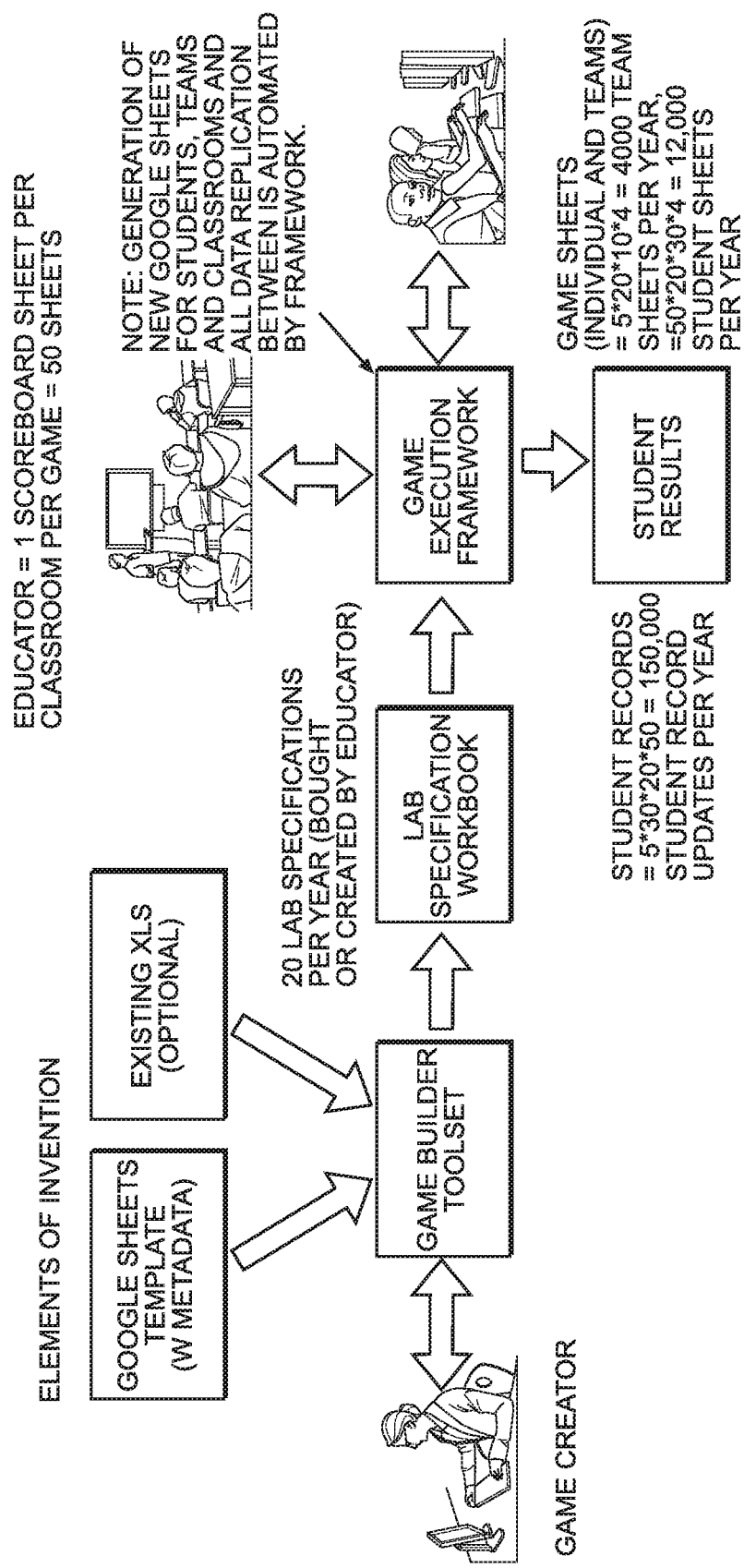
FIG. 3 is a diagrammatic view of an exemplary embodiment of the present invention, illustrating various elements thereof.
Figure 4:
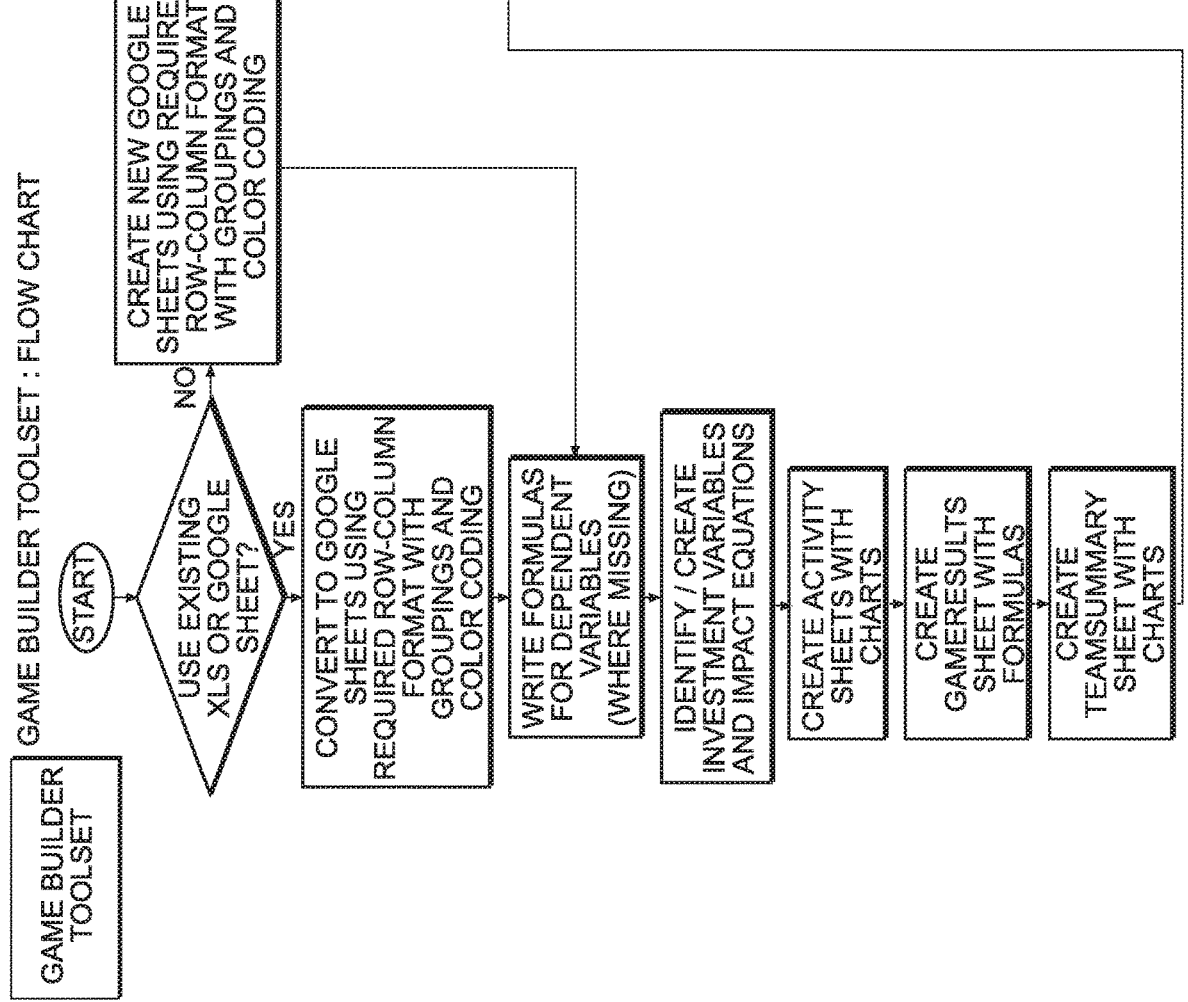
FIG. 4 is a flowchart of an exemplary embodiment of the present invention, illustrating a game being built through the system application.
Figure 7:
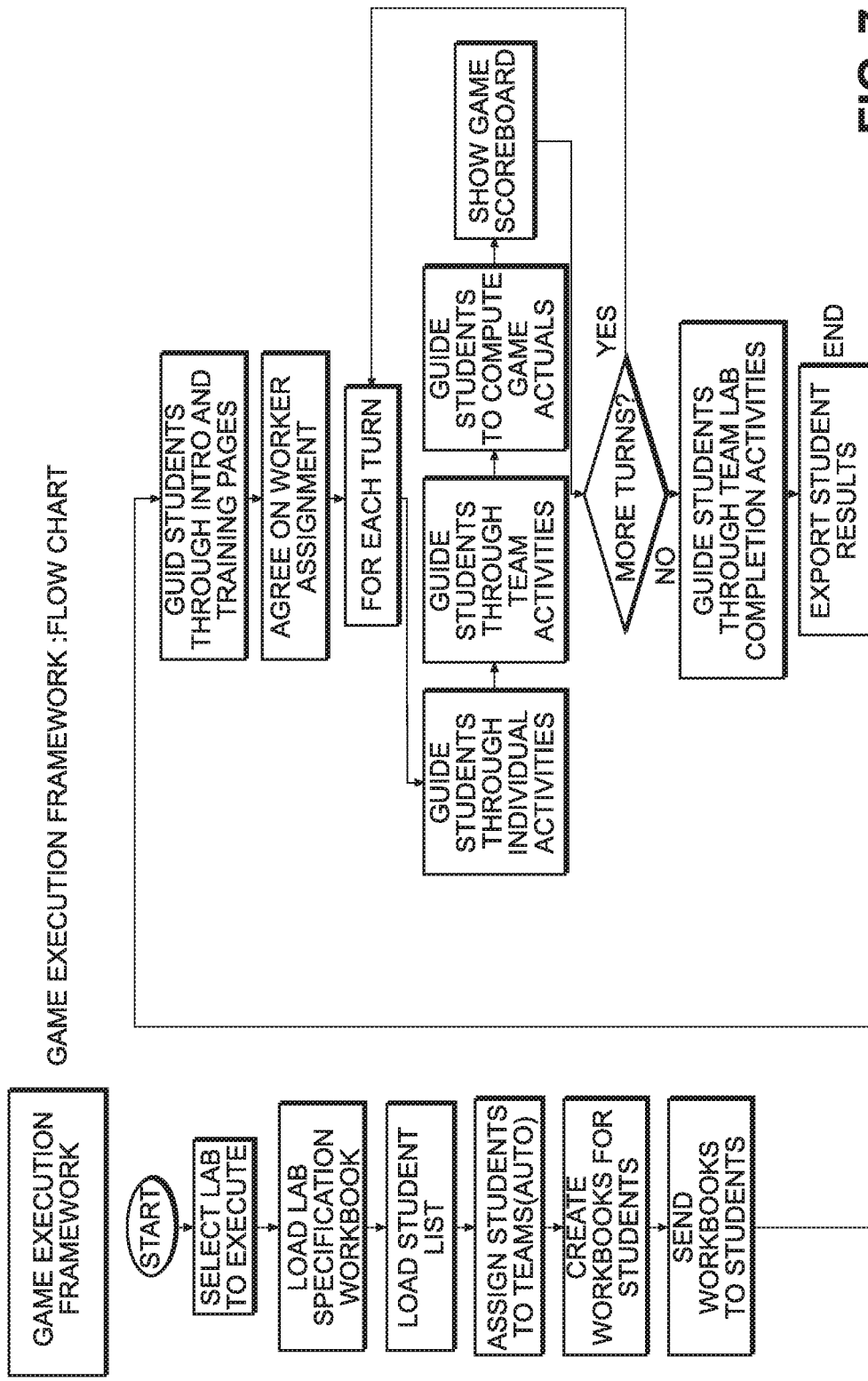
FIG. 7 is a flow chart of an exemplary embodiment of the execution of the present invention.
Figure 9:
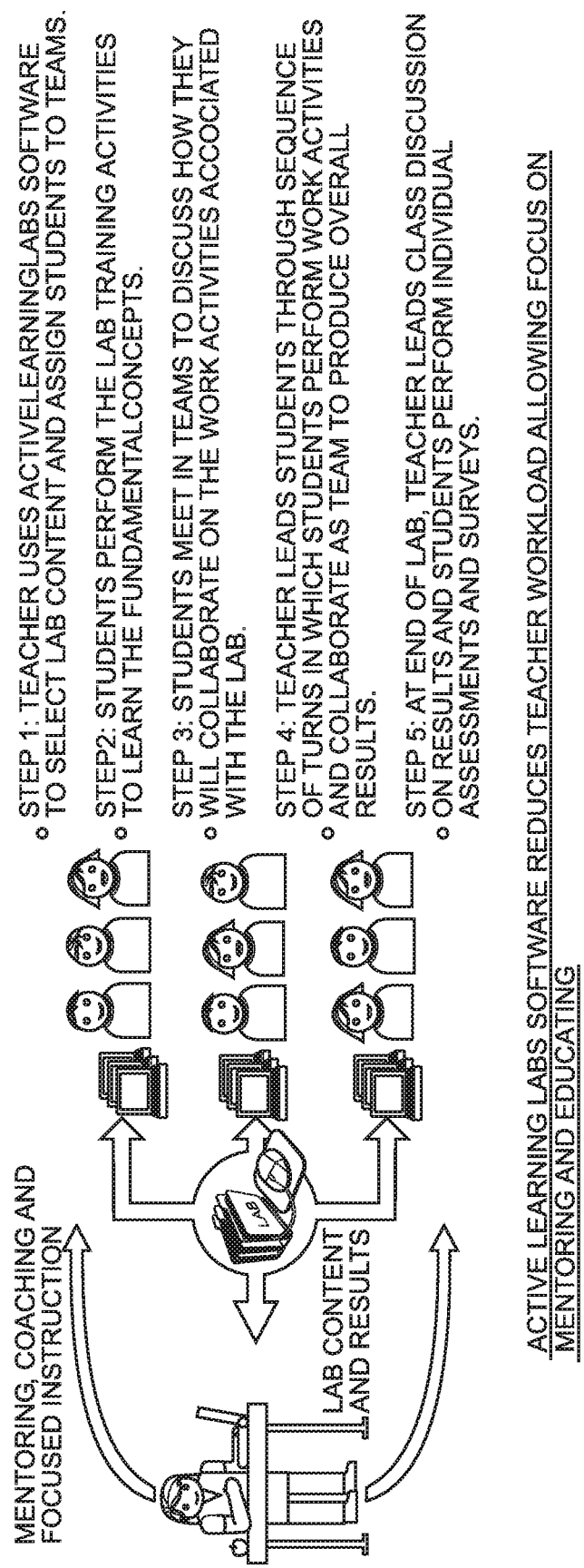
FIG. 9 is a diagrammatic view an exemplary embodiment of the present invention, illustrating the class room using the game creation application.
Figure 10:
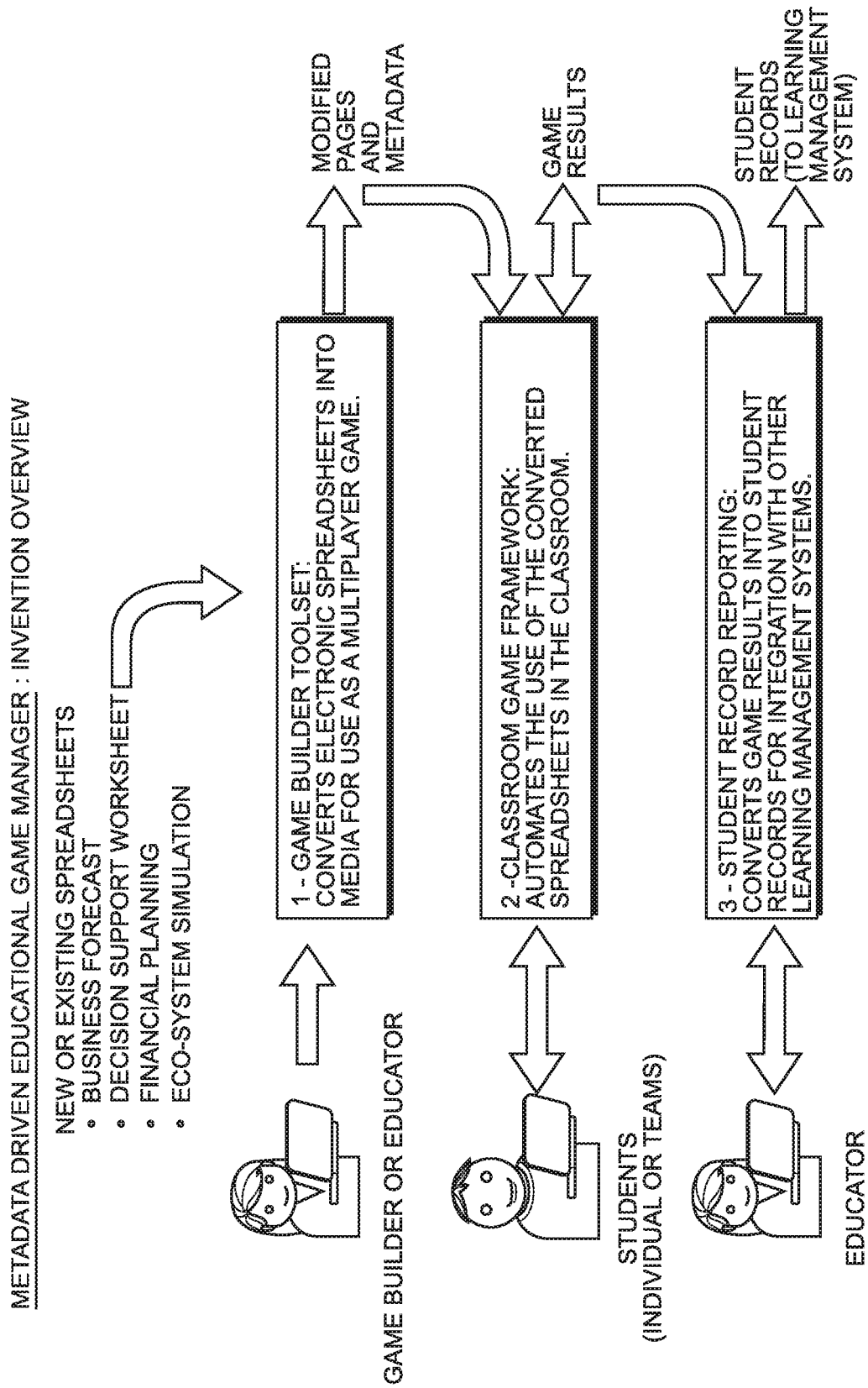
FIG. 10 is a diagrammatic view of an exemplary embodiment of the present invention, illustrating the workings of the game with meta data.
Figure 12:
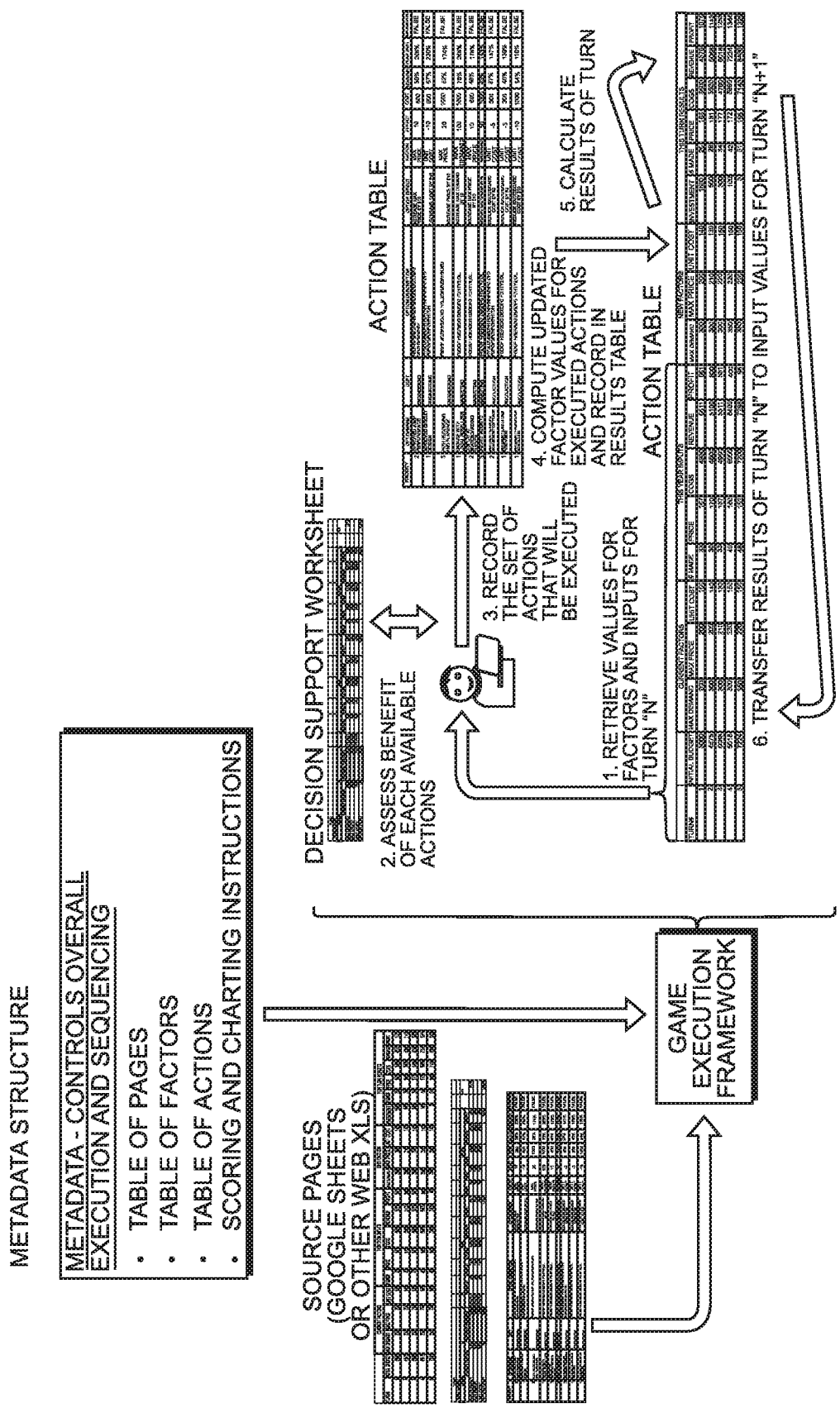
FIG. 12 is a diagrammatic view of an exemplary embodiment of the present invention, the workings of the application described with spreadsheets as information from each game is organized on a larger scale.

Referring to FIGS. 1 through 12, the present invention may include at least the three systemic components: (1) a tool set to convert electronic spreadsheets into media for use as a multiplayer game; (2) a framework to automate the use of the converted spreadsheets in the classroom; and (3) a mechanism to collect game results, student actions, student assessments and other data from the execution of the game and convert into student records for integration with other learning management systems.

The three systemic components enable a facilitator (e.g., an educator) to deliver simulation-based games with far less effort and much higher quality assessment results than they could achieve without the present invention. The automation of the game follows a standard pattern of "Training", "Game Play" and "Assessment." The present invention relates to the complex algorithms and data driven flow software that automates this sequence and allows the facilitator to manage the execution flow. The present invention may include at least one computer with a user interface. The computer may include at least one processing unit coupled to a form of memory. The computer may include, but not limited to, a microprocessor, a server, a desktop, laptop, and smart device, such as, a tablet and smart phone. The computer includes a program product including a machine-readable program code for causing, when executed, the computer to perform steps. The program product may include systemic software which may either be loaded onto the computer or accessed by the computer. The loaded systemic software may include a systemic application on a smart device. The systemic software may be accessed by the computer using a web browser. The computer may access the systemic software via the web browser using the internet, extranet, intranet, host server, internet cloud and the like.

The present invention includes at least one critical datasheet that contains the "metadata" for the game execution. The structure and content of each critical datasheet are used by all of the execution elements to control the information that is provided to the user and the sequence of activities related to game initialization, user training, turn execution, game completion and student assessment.

A method of using the present invention may include the following. The systemic application disclosed above and in the figures may be provided. A facilitator can use the systemic application to create games or purchase games that are already built. They then load a list of students (typically from an existing learning management system) and then use the systemic software application to execute the game sequence. A game will typically last 4-5 hours which will include multiple turns for every team which will be spread across a week or sessions of a predefined time period, e.g., one hour, forty-five minutes, etc. The platform uses the metadata to determine which variables in the datasheet correspond to scoring variables and which single variable corresponds to the overall score. The software uses this information to show the progress of each team after each turn and overall winning team at the end of the game. Between each turn, the facilitator can review results and show a scoreboard indicating the progress of each team. Appropriate scoring variables are unique for each game scenario, but examples include Total Revenue, Total Profit, Total Population, Population Health, etc.

In addition to the execution of the basic game mechanics, the platform uses the metadata to control events in the game sequence where additional collaboration is provided by the platform in the form of text messaging and chat and through the use of video conferencing session. The metadata provides controls to the user to initiate or schedule collaboration sessions needed to complete that portion of the game.

When the game is done, the facilitator can download the student result data to assess the performance of each student in terms of academic achievement and interpersonal skills. These assessments include but are not limited to:

measurement of time spent by each student on each activity;

measurement of the percentage of time each student participated in shared activities;

measurement of the percentage of shared text message content was contributed by each student;

measurement of the score for each individual activity assigned to the student;

measurement of the relation of the shared activity scores for each team to which a student has been associated in comparison to the classroom average for those activities.

Measurement of relation of student survey results for each team to which a student has been associated in comparison to the classroom average for surveys for the same activities.

Additionally, while the primary focus of the invention is for use in educational classroom settings, the systemic software can be used for worker training, veteran return and prisoner release training scenarios. Facilitators can use the present invention to produce ready-to-run games for sale or trade with other educators.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A system for transforming one or more electronic datasheets into an electronic multi-player simulation-based game, the system comprising:
   a processor, and
   a memory comprising computing device-executable instructions that, when executed by the processor, cause the processor to implement:
      a communications interface for accessing a simulation platform over a network;
      an admin user interface for displaying and interacting with the simulation platform;
      a plurality of player user interfaces for displaying and interacting with the simulation platform;
      a game builder module for transforming the one or more electronic datasheets to game media for the electronic multi-player simulation-based game, wherein each electronic datasheet comprises metadata including a table of factors, a table of actions, and a table of pages;
      wherein the game media comprises:
         an activity sheet created by the game builder module based on the table of actions; and
         a game result sheet created by the game builder module based on the table of factors; and
      a game framework module for automating the electronic multi-player simulation-based game so as to electronically generate a game play on the plurality of player user interfaces so as to create game results based on the activity sheet and the game result sheet, wherein the game framework module is configured to automatically determine a sequence of turns in the game play as a function of table of pages.

2. The system of claim 1, further comprising a record module for converting the game results into an exportable record.

3. The system of claim 2, wherein the sequence of turns created by the game builder module is based on a list of skills defined in a row-column format of the table of pages.

4. The system of claim 3, wherein the game media further comprises an assignment of one or more teams created by the game builder module based on the table of pages.

5. The system of claim 4, wherein each electronic datasheet further comprises a scoring instruction, and wherein the record module provides an electronic scoreboard on the plurality of player user interface for each team based on the scoring instruction.

6. The system of claim 5, further comprising a collaboration module for generating, between the plurality of player user interfaces, a collaboration message of the game play, wherein the collaboration message comprises a plurality of shared text message.

7. The system of claim 6, further comprising an assessment module for measuring an amount of time each player user interface generated an associated collaboration message.

8. The system of claim 7, wherein the table of factors comprise a plurality of variables and equations, wherein the game framework module is configured to identify the plurality of variables and equations and create the activity sheet and the game result sheet therefrom.

9. The system of claim 8, wherein the game framework module is configured to modify one or more of the variables of the plurality of variables the activity sheet and the game result sheet automatically in response to the plurality of player user interfaces interacting with the game play.

* * * * *